United States Patent
Saeuberlich et al.

(10) Patent No.: US 11,292,723 B2
(45) Date of Patent: Apr. 5, 2022

(54) TUNGSTEN CARBIDE POWDER AND PRODUCTION THEREOF

(71) Applicant: H.C. Starck Tungsten GmbH, Munich (DE)

(72) Inventors: Tino Saeuberlich, Bad Harzburg (DE); Bernhard Caspers, Vienenburg (DE); Tizian Tappe, Goslar (DE)

(73) Assignee: H.C. Starck Tungsten GmbH, Munich (DE)

( * ) Notice: Subject to any disclaimer, the term of this patent is extended or adjusted under 35 U.S.C. 154(b) by 16 days.

(21) Appl. No.: 16/330,559

(22) PCT Filed: Sep. 4, 2017

(86) PCT No.: PCT/EP2017/072114
§ 371 (c)(1),
(2) Date: Mar. 5, 2019

(87) PCT Pub. No.: WO2018/050474
PCT Pub. Date: Mar. 22, 2018

(65) Prior Publication Data
US 2020/0189918 A1   Jun. 18, 2020

(30) Foreign Application Priority Data

Sep. 15, 2016  (DE) .................. 102016011096.1

(51) Int. Cl.
*C01B 32/949* (2017.01)
*C22C 29/08* (2006.01)

(52) U.S. Cl.
CPC ............ *C01B 32/949* (2017.08); *C22C 29/08* (2013.01); *C01P 2002/60* (2013.01); *C01P 2004/50* (2013.01); *C01P 2004/64* (2013.01); *C01P 2006/12* (2013.01)

(58) Field of Classification Search
None
See application file for complete search history.

(56) References Cited

U.S. PATENT DOCUMENTS

| 4,008,090 A | 2/1977 | Miyake et al. |
| 4,948,573 A | 8/1990 | Nadkarni et al. |
| 5,071,473 A | 12/1991 | Reeder et al. |
| 5,166,103 A | 11/1992 | Krstic |
| 5,372,797 A * | 12/1994 | Dunmead .............. B82Y 30/00 423/439 |
| 5,567,662 A | 10/1996 | Dunmead et al. |

(Continued)

FOREIGN PATENT DOCUMENTS

| CN | 103303979 A | 9/2013 |
| JP | S 54130407 A | 10/1979 |

(Continued)

OTHER PUBLICATIONS

International Search Report for PCT/EP2017/072114, dated Oct. 9, 2017, 3 pages.

(Continued)

*Primary Examiner* — Guinever S Gregorio
(74) *Attorney, Agent, or Firm* — Dority & Manning, P.A.

(57) ABSTRACT

The present invention relates to novel tungsten carbide powder which a specific BET-surface, crystallite number and size, to a method for the production and use thereof.

19 Claims, 7 Drawing Sheets

(56) References Cited

U.S. PATENT DOCUMENTS

| | | |
|---|---|---|
| 7,605,542 B2 | 12/2009 | Zhang et al. |
| 2012/0210822 A1 | 8/2012 | Konyashin et al. |

FOREIGN PATENT DOCUMENTS

| | | |
|---|---|---|
| JP | H 03208811 A | 9/1991 |
| JP | H 04354839 A | 12/1992 |
| JP | 2005335997 A | 12/2005 |
| JP | 2006346776 A | 12/2006 |
| WO | WO 2008/032437 A1 | 3/2008 |

OTHER PUBLICATIONS

Lidin R.A., et al.. "Chemical Properties of Inorganic Materials", Moscow, Chemistry, 2000, p. 394.

Ponomrchuk Yu.V., "Nanostructured Mutual Systems of Transition Metals: Study of Phase Composition, Composition of Phases and Structural Characteristics by X-Ray Methods", Ph.D. Thesis in Chemical Sciences, Kemerovo, FSFEI HPE, Kemerovo State University, 2015, pp. 11, 20, 21, 25, 32, 35, 36-38, 47.

Safronov A.P., Adamova L.V., "Evaluation of Parameters of Porous Structure and Specific Surface Area of Nanoscale Materials Using Automatic Gas Adsorption Analvzer TRISTAR 3020", Laboratory Manual, Ekaterinburg, SEI HPE, Ural State University named after A.M. Gorky, 2008, p. 394.

Russian Search Report dated Feb. 2, 2021, 3 pages.

\* cited by examiner

TUNGSTEN CARBIDE POWDER AND PRODUCTION THEREOF

CROSS REFERENCE TO RELATED APPLICATIONS

This application is the national stage entry of International Patent Application No. PCT/EP2017/072114 having a filing date of Sep. 4, 2017, which claims priority to and the benefit of German Patent Application No. 102016011096.1 filed in the German Patent Office on Sep. 15, 2016, the entire contents of which are incorporated herein by reference.

All documents cited in the present application are incorporated in the present disclosure by reference in their entirety. However, such incorporation holds only where the material incorporated is not in conflict with the definitions, statements or disclosure of the present invention. In case of conflict, the contents of the present application have priority.

The present invention relates to a novel tungsten carbide powder in which the tungsten carbide particles have specific properties, a process for the production thereof, and the use thereof.

PRIOR ART

Tungsten carbide is characterized by a particular hardness, which is almost as high as that of diamond. Accordingly, tungsten carbide is useful for many technical applications, especially if the high hardness of the material is wanted, for example, in drill heads and the like. Tungsten carbide is an intermediary crystal phase of the elements tungsten and carbon, formed by carbon atoms deposited between the lattice sites of tungsten by carburizing. The reaction proceeds via $W_2C$ to WC, represented in a simplified way as proceeding from tungsten trioxide: $WO_3$+ C→WC. Tungsten carbide is also formed by the reduction of tungsten oxides with carbon, which is the reason why hydrogen is often employed as a reducing agent in the production.

In the prior art, a wide variety of methods for the preparation of tungsten carbide powders and a wide variety of specific tungsten carbide powders as such are described.

However, it happens now and again that the known tungsten carbide powders are problematic in the processing, for example, of new applications are to be realized.

Further, the known production methods are often non-optimal, and many of the known methods are not suitable for realization on a large technical scale.

Object

Therefore, it has been the object of the present invention to provide tungsten carbide powders that are different from those of the prior art, more easily processed, and result in products, especially cemented carbide structures, having better properties.

Also, it has been the object of the present invention to provide a process by which tungsten carbide powders that have improved properties over those of the prior art powders can be produced. The process should be applicable on an industrial scale.

Last but not least, uses for the novel tungsten carbide powders and the tungsten carbide powders produced by the novel process should be found.

Solution

One aspect of the object is achieved by tungsten carbide powders having a BET specific surface area of from 1.7 to 2.3 $m^2/g$, a crystallite size in the individual tungsten carbide grains of from 75 to 100 nm, and an average maximum number of crystallites per tungsten carbide grain of 2.7 or less.

Another aspect of the object is achieved by a direct carburizing process, in which tungsten carbide powders are prepared from ammonium paratungstate and carbon black by thermal treatment of $WO_3$/carbon black particles in two steps, followed by further processing.

Different aspects of the object are achieved particularly well by the embodiments described below, and by the embodiments shown in the claims.

Definitions of Terms

Within the scope of the present invention, all indications of quantity are to be understood as indications of weight, unless stated otherwise.

Within the scope of the present invention, all process steps are performed under normal pressure/atmospheric pressure, i.e., under 1013 mbar, unless stated otherwise.

Within the scope of the present invention, the wording "and/or" includes both any combination and all combinations of the elements mentioned in the respective list.

Within the scope of the present invention, indications of temperature are in degrees centigrade (° C.), unless stated otherwise.

Within the scope of the present invention, "particle/grain" means structures limited by an interface between the gas and solid phases. These may cluster to loose agglomerates, which are held together merely by adhesion and can be separated into primary particles during dispersion. Particles/grains can be constituted by one or more "crystallites", which are limited by crystallite boundaries and grain boundaries. A crystallite boundary separates regions of different crystallographic orientation, but otherwise the same crystal structure. The cohesion among the crystallites within a particle is clearly stronger than the cohesion among particles within an agglomerate. Thus, they cannot be separated by dispersion. These relationships are illustrated graphically in the attached FIG. 7 by way of example.

DETAILED DESCRIPTION

The present invention relates to a tungsten carbide powder with
- a BET specific surface area as determined according to ASTM D 3663 of from 1.7 to 2.3 $m^2/g$;
- a crystallite size c in the individual tungsten carbide grains of from 75 to 100 nm, as determined by radiography using XRD/X-ray diffraction, single line, Scherrer method, and Fourier peak transformation evaluation with a NIST-certified crystallite size specimen as a reference;
- an average grain size d, calculated by means of the formula d (in nm)=$0.38((m^2 \cdot nm)/g)$/BET (in $m^2/g$)·1000 from the BET specific surface area, of from 162 nm to 230 nm;
- an average maximum crystallite number, n, per tungsten carbide grain, calculated according to n=d/c, of 2.7 or less.

In a variant of the present invention, the tungsten carbide powder has a BET specific surface area of from 1.8 to 2.0 $m^2/g$.

In a variant of the present invention, the tungsten carbide powder has crystallite sizes in the individual tungsten carbide grains of from 75 to 95 nm.

In a variant of the present invention, the tungsten carbide powder has an average maximum crystallite number per tungsten carbide grain of from 1.8 to 2.7.

In a variant of the present invention, the tungsten carbide powder has an average grain size of from 162 nm to 230 nm.

In a variant of the present invention, the tungsten carbide powder has been prepared by a direct carburizing process.

Thus, the present invention further relates to a tungsten carbide powder as described above, prepared by the following direct carburizing process comprising or consisting of the following steps in the stated order:

a) providing ammonium paratungstate and calcining to $WO_3$, followed by deagglomerating and optionally classifying;
b) mixing and kneading the $WO_3$ prepared in step a) with carbon black, water and organic binder;
c) extruding the product prepared in step b) into extruded rods having a length of smaller than or equal to 10 mm, followed by drying;
d) thermally reacting the $WO_3$/carbon black pellets in a reaction oven, preferably a rotary kiln or tunnel kiln, at 900 to 1200° C. in the presence of a minimum amount of argon to form a tungsten carbide precursor;
d1) optionally cooling the material down to room temperature;
e) thermally treating the precursor in a pusher furnace at temperatures of from 1300 to 2000° C. under a hydrogen atmosphere;
f) deagglomerating and optionally classifying the tungsten carbide, and homogenization.

These tungsten carbide powders are also synonymously referred to as "tungsten carbide powders according to the invention" or "powders according to the invention" within the scope of the present application.

Further, the present invention relates to a direct carburizing process for preparing a tungsten carbide powder, comprising or consisting of the following steps:

a) providing ammonium paratungstate and calcining to $WO_3$, followed by deagglomerating and classifying;
b) mixing and kneading the $WO_3$ prepared in step a) with carbon black, water and organic binder;
c) extruding the product prepared in step b) into extruded rods having a length of smaller than or equal to 10 mm, followed by drying;
d) thermally reacting the $WO_3$/carbon black pellets in a reaction oven, preferably a rotary kiln or tunnel kiln, at 900 to 1200° C. in the presence of a minimum amount of argon to form a tungsten carbide precursor;
e) thermally treating the precursor in a pusher furnace at temperatures of from 1300 to 2000° C. under a hydrogen atmosphere;
f) deagglomerating and classifying the tungsten carbide, and homogenization.

This direct carburizing process is also synonymously referred to as "direct carburizing process according to the invention", "carburizing process according to the invention" or "process according to the invention" within the scope of the present application. The process steps and conditions are the same as stated above for the tungsten carbide powder according to the invention prepared by a direct carburizing process.

Last but not least, the present invention also relates to the use of the tungsten carbide powder according to the invention as described above or of a tungsten carbide powder prepared by the process according to the invention as described above.

In one embodiment of the present invention, the use is selected from the group consisting of the use for
the preparation of cemented carbides, optionally in combination with metallic binders Fe, Co, Ni, preferably:
  a) WC/Co-based cemented carbides,
  b) WC/Co-based cemented carbides using grain growth inhibitors (VC, $Cr_3C_2$, TaC, TiC),
  c) cermets and P-code cemented carbides in combination with other carbides of elements Ti, Ta, Zr, Hf, Mo, Nb, W, Cr, Fe,
  d) cemented carbides on the basis of nitrides as hard materials,
  e) submicron grain cemented carbides with a Vickers hardness HV30 of >1600,
  f) binder-less cemented carbides (CC binder content: less than 2%);
machining tools, such as drills, cutters, indexable inserts, or planer knives;
heavy duty components, such as drill heads;
watchmaking;
use as neutron deflector;
armor-piercing projectiles;
pen balls;
tire or shoe spikes;
surgical instruments.

In one variant, the tungsten carbide powders according to the invention are characterized by a unique crystallite size as compared to the grain size, characterized by a unique crystallite number per grain of from 1.8 to 2.7 and grain size, characterized by a BET surface area within a range of from 1.7 to 2.3 $m^2/g$.

In some embodiments, which may also be preferred, the following parameters are observed in step a), wherein the respective parameters can be combined independently:

The calcination is performed at temperatures of from 300° C. to 1000° C. The set pressure can be selected within a wide range, and preferably pressures of from −50 mbar to +50 mbar (relative to atmospheric pressure) can be set. Ambient pressure, i.e. atmospheric pressure that is affected only by the furnace atmosphere, is particularly preferred.

One variant includes tungsten oxides that are completely oxidized and have a W to O ratio of more than 1 (W) to 2.9 (O) (based on the chemical formula $WO_3$).

The deagglomeration is effected by means of grinding aggregates, such as preferably crushers, vibration mills, jet mills, ball mills, roller mills, rod mills, hammer mills, impact mills, tumbling mills, pinmills, pin-disk mills, or planetary mills.

Optionally, classification is effected with a target value of a grain size distribution with a $d_{98}$ of less than or equal to 30 μm, as determined by particle size determination with laser diffraction according to ISO standard 13320 (2009) (laser diffraction mastersizer).

In some embodiments, which may also be preferred, the following parameters are observed in step b), wherein the respective parameters can be combined independently:

The mixing and kneading is effected at a temperature of from 50° C. to 120° C.

The duration of said mixing and kneading is from 3 to 20 minutes (for a continuous process) and from 1 to 5 hours (for a discontinuous/batch-type process).

Preferred are
  1.) kneaders/extruders, preferably horizontal kneaders, vertical kneaders, continuous kneaders, for example, of the types internal mixers, cylinder kneaders, double-Z kneaders, spiral kneaders);
  or
  2.) intensive mixers, preferably EIRICH mixers.

The organic binder serves to bind WO$_3$ with carbon black, and to ensure the strength of the granules. Suitable binders consist of the elements carbon, hydrogen and oxygen, and have an OH or COOH group in order to achieve miscibility with water. Preferred examples include polyvinyl alcohol (PVA) or polyacrylic acid (PAA).

In some embodiments, which may also be preferred, the following parameters are observed in step c), wherein the respective parameters can be combined independently; stable granules are obtained thereby:

- The extrusion is effected by pressing the mixture of WO$_3$/carbon black through a perforated disk, bringing it to a defined length of less than/equal to 10 mm, preferably by shearing off by means of a rotating cutter tool, for example.
- The drying temperature is from 80° C. to 200° C., and the drying time is from 1 hour to 24 hours.

In some embodiments, which may also be preferred, the following parameters are observed in step d), wherein the respective parameters can be combined independently:

- The reaction oven is a rotary kiln or tunnel kiln.
- The pressure is at 2 to 50 mbar of atmospheric overpressure.
- The temperature is maintained for 30 to 600 minutes.
- The amount of argon employed is from 0.01 to 20% by volume of the oven atmosphere.
- A uniform, homogeneous heating of the material is preferred.

In some embodiments, which may also be preferred, the following parameters are observed in optional step d1), wherein the respective parameters can be combined independently:

- The material is cooled down to room temperature.
- An atmospheric separation of the 1st and 2nd process steps is set.

In some embodiments, which may also be preferred, the following parameters are observed in step e):

- The pressure is at 2 to 50 mbar of atmospheric overpressure.
- The amount of hydrogen is preferably from 60 to 100% by volume of the oven atmosphere.
- The temperature is maintained for 30 to 600 minutes.

In some embodiments, which may also be preferred, the following parameters are observed in step f), wherein the respective parameters can be combined independently:

- The deagglomeration is effected by means of grinding aggregates, preferably crushers, vibration mills, jet mills, ball mills, roller mills, rod mills, hammer mills, impact mills, tumbling mills, pinmills, pin-disk mills, or planetary mills.
- The classification is preferably effected by means of classifiers with a target value of a grain size distribution with a $d_{98}$ of less than or equal to 5 µm, as determined by particle size determination with laser diffraction according to ISO standard 13320 (2009) (laser diffraction mastersizer). The value of the classification renders the maximum size of the agglomerates, serving the function of a "protective screening".
- The homogenization is effected with a mixing time of from 10 minutes to 240 minutes in a suitable mixer, preferably a free fall mixer, compulsory mixer, Y-branch mixers, agitator mixers, or paddle mixers.

In contrast to the direct carburizing process known from JPH03208811, WO$_3$/carbon black granules having specific properties (extruded rods having a length of smaller than or equal to 10 mm) are employed in the process according to the invention. In addition, a nitrogen atmosphere need not be employed in the carbidic conversion reaction in the first thermal reaction according to the invention. In addition, a pusher furnace rather than a rotary kiln is used in the second thermal reaction according to the invention.

Surprisingly, it has been found that powders can be produced by the process according to the invention through a direct carburizing process in a controlled way to the extent that their specific surface areas fall into a range of the finest conventionally prepared tungsten carbide powders of about 2 m$^2$/g.

Further, a ratio of crystallite size to BET as in the present invention could not be achieved with any known process. This can also be seen from FIG. 6, for example.

One advantage of the present invention resides in the fact that a process for the production of a tungsten carbide powder having

- a crystallite size of 75-100 nm with
- a BET surface area of 1.7-2.3 m$^2$/g, and with
- a number of crystallites of at most 2.7 through a direct carburizing process was developed, which (a) is suitable for industrial-scale production, and (b) meets the seeking and demands of the economic and ecological boundary conditions.

Further, by means of this invention, (c) powders having unique powder properties leading to advantageous application properties could be provided; for example, to an increase in homogeneity in cemented carbide structures, and to an increase in strength as well as an increase of fracture toughness.

It is known that an increase in homogeneity in the (cemented carbide) structure leads to an increase in strength and to an increase in fracture toughness, and in this respect, the powders of the present invention are excellently suitable for preparing cemented carbide structures.

A variant of the present invention is a direct carburizing process consisting of the following steps in the stated order:

a) providing ammonium paratungstate and calcining at 300° C. to 1000° C. under ambient pressure to form WO$_3$, followed by deagglomerating in a grinding aggregate selected from the group consisting of crushers, vibration mills, jet mills, ball mills, roller mills, rod mills, hammer mills, impact mills, tumbling mills, pinmills, pin-disk mills, or planetary mills, and classifying with a target value of a grain size distribution with a $d_{98}$ of less than or equal to 30 µm, as determined by particle size determination with laser diffraction according to ISO standard 13320 (2009) (laser diffraction mastersizer);

b) mixing and kneading the WO$_3$ prepared in step a) with carbon black, water and organic binder for from 3 to 20 minutes (for a continuous process) and from 1 to 5 hours (for a discontinuous/batch-type process) at a temperature of from 50° C. to 120° C.;

c) extruding the product prepared in step b) into extruded rods having a length of smaller than or equal to 10 mm, followed by drying at 80° C. to 200° C. for a duration of from 1 hour to 24 hours;

d) thermally reacting the WO$_3$/carbon black pellets in a rotary kiln or tunnel kiln at a temperature of from 900 to 1200° C. under 2 mbar to 50 mbar of atmospheric overpressure in the presence of 0.01 to 20% by volume of argon, based on the oven atmosphere, for 30 minutes to 600 minutes to form a tungsten carbide precursor;

d1) cooling the material down to room temperature;

e) thermally treating the precursor in a pusher furnace at temperatures of from 1300 to 2000° C. under a hydrogen atmosphere under 2 mbar to 50 mbar of atmospheric overpressure for 30 minutes to 600 minutes;

f) deagglomerating the tungsten carbide in a grinding aggregate selected from the group consisting of crushers, vibration mills, jet mills, ball mills, roller mills, rod mills, hammer mills, impact mills, tumbling mills, pinmills, pin-disk mills, or planetary mills; classifying with a target value of a grain size distribution with a $d_{98}$ of less than or equal to 5 µm, as determined by particle size determination with laser diffraction according to ISO standard 13320 (2009) (laser diffraction mastersizer); and homogenization with a mixing time of from 10 minutes to 240 minutes in a mixer selected from the group consisting of a free fall mixer, compulsory mixer, Y-branch mixer, agitator mixer, or paddle mixer.

Another variant of the present invention relates to a tungsten carbide powder produced by this direct carburizing process.

The various embodiments and variants of the present invention, but not, for example, exclusively those of the various dependent claims, can be combined in any desirable way.

The invention will now be explained with reference to the following non-limiting Examples and the Figures.

It is further seen that the powders of the present invention (Cu ground section photograph employed at the top left, related to measuring point 5) lead to products that have a higher crystallinity, less crystallites per particle, less particle defects, and a more homogeneous structure as compared to the powders of the prior art (Cu ground section photograph employed at the bottom right, related to the encircled measuring point at coordinates about 55/210).

Figure 7:
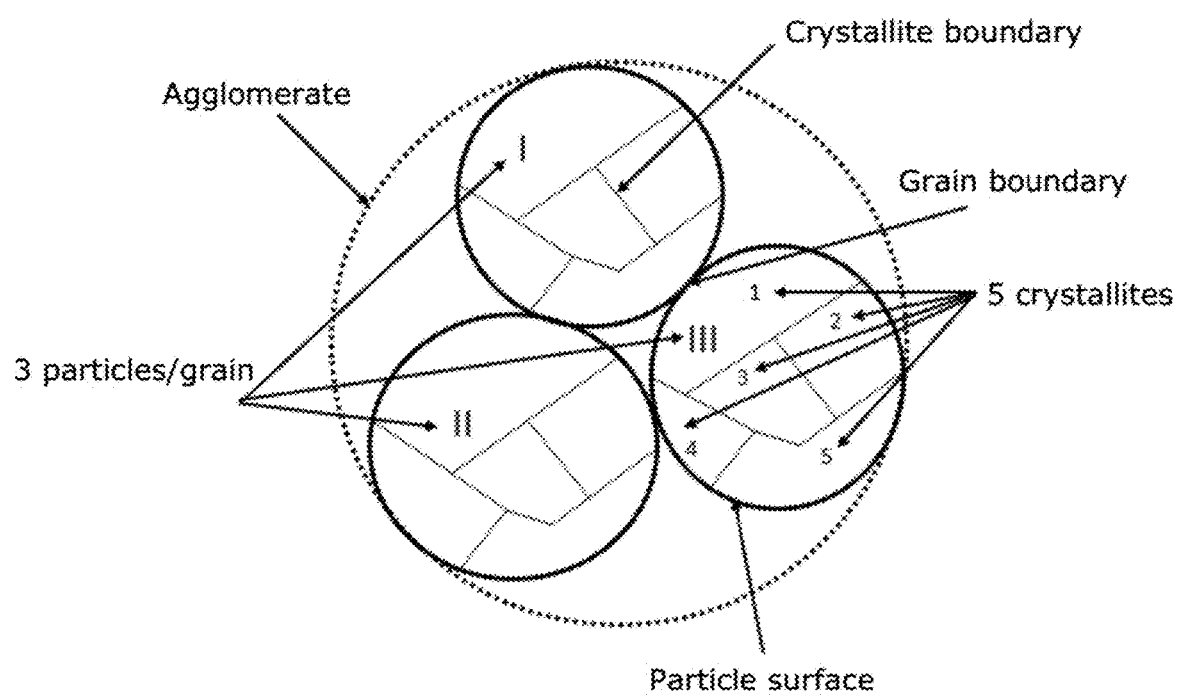

FIG. 7 illustrates relationships between crystallite, particle/grain, and agglomerate.

EXAMPLES

Preparation Pathway No. 1 "Batch Type" (Examples 2 and 3):

Ammonium paratungstate was calcined to $WO_3$ at temperatures of 300° C.-1000° C. and under atmospheric pressure, followed by deagglomeration at room temperature using a pin-disk mill, and classifying to a $d_{98}$ target value of a grain size distribution of less than 30 μm (by particle size determination with laser diffraction according to ISO standard 13320 (2009)).

The deagglomerated tungsten oxide was then mixed with carbon black, water and an organic binder (polyvinyl alcohol, PVA), and kneaded for 120 minutes at 80° C. using a double-Z kneader, followed by extrusion to extruded rods using a perforated disk and rotating cutter tool, and cut to a length of less than 10 mm. Subsequently, these extruded rods were dried for 24 hours at 110° C. The extruded rods were then conveyed into a reaction oven for preparing the first thermal step (graphite boat, batch furnace, low bed height, monolayer of the extruded rods), where they were heated homogeneously. The reaction took place therein according to the (simplified) reaction equation: $WO_3$+ C→WC. The gases CO and $CO_2$ were also formed thereby. The temperature was between 900° C. and 1200° C. (heating to 800° C. with maximum heating power, and then to 1200° C. with a heating rate of 10 K/min), the pressure was around 5 mbar, and the oven atmosphere contained 12% by volume argon. The product was then transferred into a pusher furnace (boat pusher furnace). In order to adjust the sintering stability, 90% by volume of hydrogen was added in this second thermal step, and maintained for 350 minutes under a pressure of 3 mbar to 5 mbar at temperatures of from 1300 to 2000° C. Subsequently, deagglomeration using a pin-disk mill was effected to a target value of a grain size distribution with a $d_{98}$ of less than or equal to 5 μm (particle sizes determined by laser diffraction according to ISO standard 13320 (2009)). A classification was not performed. Ultimately, the homogenization of the WC powder was effected for 30 minutes in a free fall mixer of the double-cone mixer type.

Preparation Pathway No. 2 "Continuous" (Examples 1, 4 and 5):

Ammonium paratungstate was calcined to $WO_3$ at temperatures of 300° C.-1000° C. and under atmospheric pressure, followed by deagglomeration at room temperature using a jet mill, and classifying to a $d_{98}$ target value of a grain size distribution of less than 30 μm (by particle size determination with laser diffraction according to ISO standard 13320 (2009)). The deagglomerated tungsten oxide was then mixed with carbon black, water and an organic binder (polyacrylic acid, PAA), and kneaded for 120 minutes at 80° C. using a double-Z kneader, followed by extrusion to extruded rods using a perforated disk and rotating cutter tool, and cut to a length of less than 10 mm. Subsequently, these extruded rods were dried for 24 hours at 110° C. The extruded rods were then conveyed into a reaction oven (rotary kiln) for preparing the first thermal step, where they were heated homogeneously. The reaction took place therein according to the (simplified) reaction equation: $WO_3$+ C→WC. The gases CO and $CO_2$ were also formed thereby. The temperature was between 900° C. and 1200° C., the pressure was around 5 mbar, and the oven atmosphere contained 8% by volume argon. The product was then transferred into a pusher furnace (boat pusher furnace). In order to adjust the sintering stability, 90% by volume of hydrogen was added in this second thermal step, and maintained for 350 minutes under a pressure of 3 to 5 mbar and at temperatures of from 1300 to 2000° C.

Subsequently, deagglomeration and classification using a jet mill with incorporated classifier was effected to a target value of a grain size distribution with a $d_{98}$ of less than or equal to 5 μm (particle sizes determined by laser diffraction according to ISO standard 13320 (2009)), and ultimately, the homogenization of the WC powder was effected for 30 minutes in a free fall mixer of the double-cone mixer type.

Figure 5:
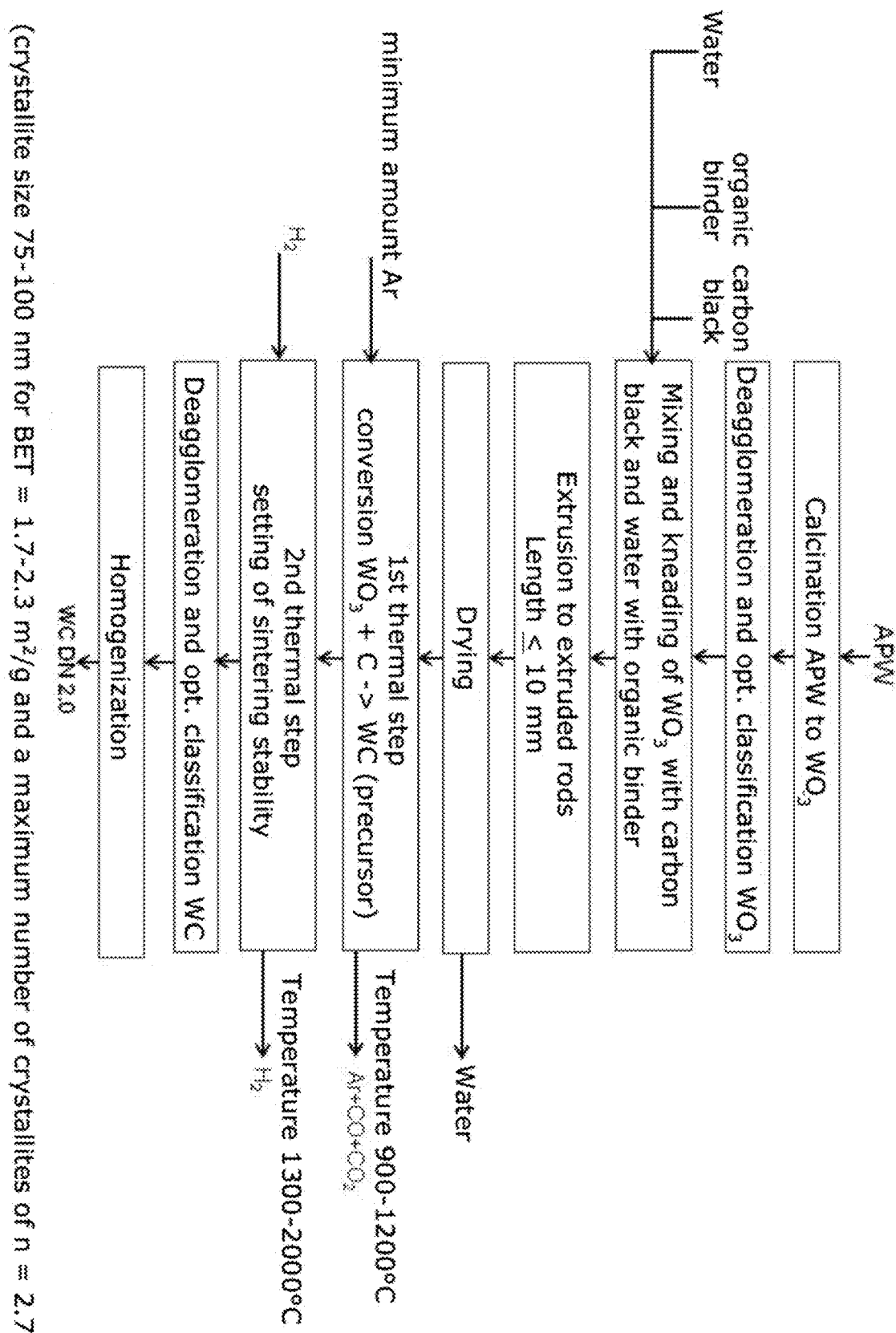
FIG. 5 shows a flow chart of an embodiment according to the invention of the process according to the invention.

The process steps of the preparation pathways No. 1 (batch type) and No. 2 (continuous) can be combined and exchanged as desired in principle as long as the order as illustrated in FIG. 5 is observed in order to achieve comparable substance properties of the tungsten carbide powders according to the invention. With these two methods, five different batches of tungsten carbide powder (Examples 1 to 5) were prepared, and their properties and characteristics are summarized in the following Table 1:

TABLE 1

|  | Ex. 1 | Ex. 2 | Ex. 3 | Ex. 4 | Ex. 5 | Unit |
|---|---|---|---|---|---|---|
| Carbon, total | 6.18 | 6.14 | 6.14 | 6.16 | 6.12 | % |
| Carbon, free | 0.05 | 0.03 | 0.02 | 0.05 | 0.02 | % |
| Carbon, bound | 6.13 | 6.11 | 6.12 | 6.11 | 6.10 | % |
| Oxygen | 0.15 | 0.14 | 0.12 | 0.16 | 0.15 | % |
| FSSS lab milled* | 0.62 | 0.59 | 0.59 | 0.60 | 0.63 | μm |
| BET | 1.84 | 1.94 | 1.96 | 1.91 | 1.80 | m$^2$/g |
| BET calculated grain size | 207 | 196 | 194 | 199 | 211 | nm |
| d10 | 0.41 | 0.34 | 0.34 | 0.32 | 0.35 | μm |
| d50 | 0.79 | 0.62 | 0.61 | 0.61 | 0.65 | μm |
| d90 | 1.42 | 1.12 | 1.10 | 1.14 | 1.13 | μm |
| d95 | 1.67 | 1.28 | 1.27 | 1.32 | 1.28 | μm |
| Crystallite size | 94.5 | 75.7 | 81.5 | 78.0 | 82.2 | nm |
| Number of crystallites | 2.19 | 2.59 | 2.38 | 2.55 | 2.57 | |

*determined using a Fisher Sub-Sieve Sizer

A direct comparison of a tungsten carbide powder prepared according to the production protocol stated above (Example 1) with a powder prepared by a conventional process (WC DS 50 of the company H.C. Starck; proceeding from tungsten metal powder and carbon black) is found in the following Table 2:

TABLE 2

|  | Example 1 | WC DS 50 | Unit |
|---|---|---|---|
| Carbon, total | 6.18 | 6.10 | % |
| Carbon, free | 0.05 | 0.03 | % |
| Carbon, bound | 6.13 | 6.07 | % |
| Oxygen | 0.15 | 0.29 | % |
| BET | 1.84 | 2.13 | m$^2$/g |
| BET calculated grain size | 207 | 178 | nm |
| d10 | 0.41 | 0.32 | μm |
| d50 | 0.79 | 0.62 | μm |
| d90 | 1.42 | 1.16 | μm |
| d95 | 1.67 | 1.35 | μm |
| Bulk density | 26 | 35 | g/inch$^3$ |
| Crystallite size | 94.5 | 39.0 | nm |
| Number of crystallites | 2.19 | 4.57 | |
| Cemented carbide properties | | | |
| Composition: WC 86.8%, Co 12%, 0.4% VC, 0.8% Cr$_3$C$_2$ | | | |
| Attritor grinding, sintering: 60 min/1460° C./vacuum | | | |
| Density | 14.14 | 14.15 | g/cm$^3$ |
| Hardness | 1661 | 1680 | HV30 |
| Rockwell | 92.2 | 92.3 | |
| Coercive force | 298 | 316 | Oe |
| Magnetic saturation | 192 | 185 | Gcm$^3$/g |
| Relative magnetic saturation | 79 | 76 | % |
| Grain growth | 0-1 = 2-3 μm | 0-1 = 2-3 μm | |

The WC crystallite sizes were measured by XRD (X-ray diffraction, single line) for all specimens examined (Scherrer method, Fourier peak transformation evaluation). A NIST-certified crystallite size specimen (lanthanum hexaboride LaB$_6$) was used as a reference.

All the specimens examined were measured on the same device in order to exclude peak broadenings caused by inaccuracies of the measurement system and measuring deviations.

X-ray diffraction is a generally known method for measuring the crystallite size. It reliably yields an average crystallite size, proceeding from the width and height of the peak characteristic.

From the BET surface area, the grain size d was calculated according to the following formula:

$$BET \text{ grain size } d(\text{in nm}) = 0.38((m^2 \cdot nm)/g)/BET(\text{in } m^2/g) \cdot 1000.$$

The number of crystallites n was calculated from the grain size d, which was calculated from the BET surface area, and the crystallite size c, which was determined by radiography, according to the following formula:

$$\text{number of crystallites } n = d/c$$

Example: number of crystallites n=207 nm/94.5 nm=2.19

Figure 6:
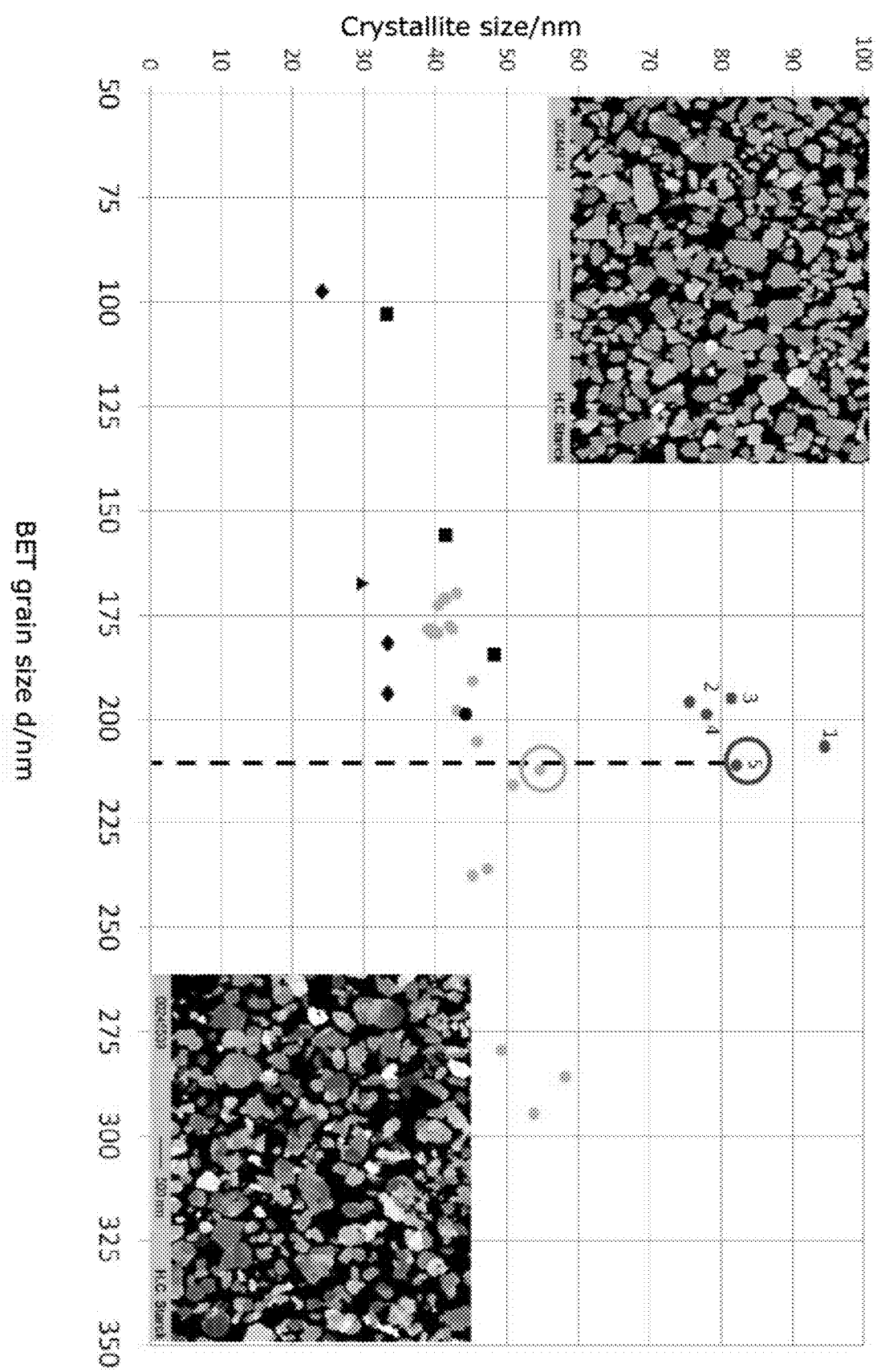
FIG. 6 shows the relationship between the crystallite size and the grain size as determined by the BET method of tungsten carbide powders of the present invention (represented by the measuring points labeled with numbers 1 to 5) and of the prior art (represented by the remaining measuring points; the points represent products of the company H.C. Starck, while the remaining represent products of other manufacturers).

For comparison, different foreign specimens and internal WC comparative powders prepared in a conventional way were examined. The crystallite sizes of the foreign specimens and of the internal WC comparative powders having different BET grain sizes were always within a range of >24 nm and <60 nm. This is represented in FIG. 6.

The related numbers of crystallites per WC grain were a minimum of n=3.1 in singular cases, but mostly values within a range of n=3.7 to 5.9 were determined. None of the examined powders had a crystallite size that was even approximately that of the tungsten carbide powder according to the invention, or less than n=2.7 crystallites per WC grain.

This enormous difference between the tungsten carbide powders according to the invention and those of the prior art is due to the newly developed procedure.

The typical powder properties (except for the crystallite size and the number of crystallites) and some cemented carbide properties of the tungsten carbide powders according to the invention are comparable to those of the prior art, for example, WC DS 50 (via reaction pathway WMP+C).

Figure 1:
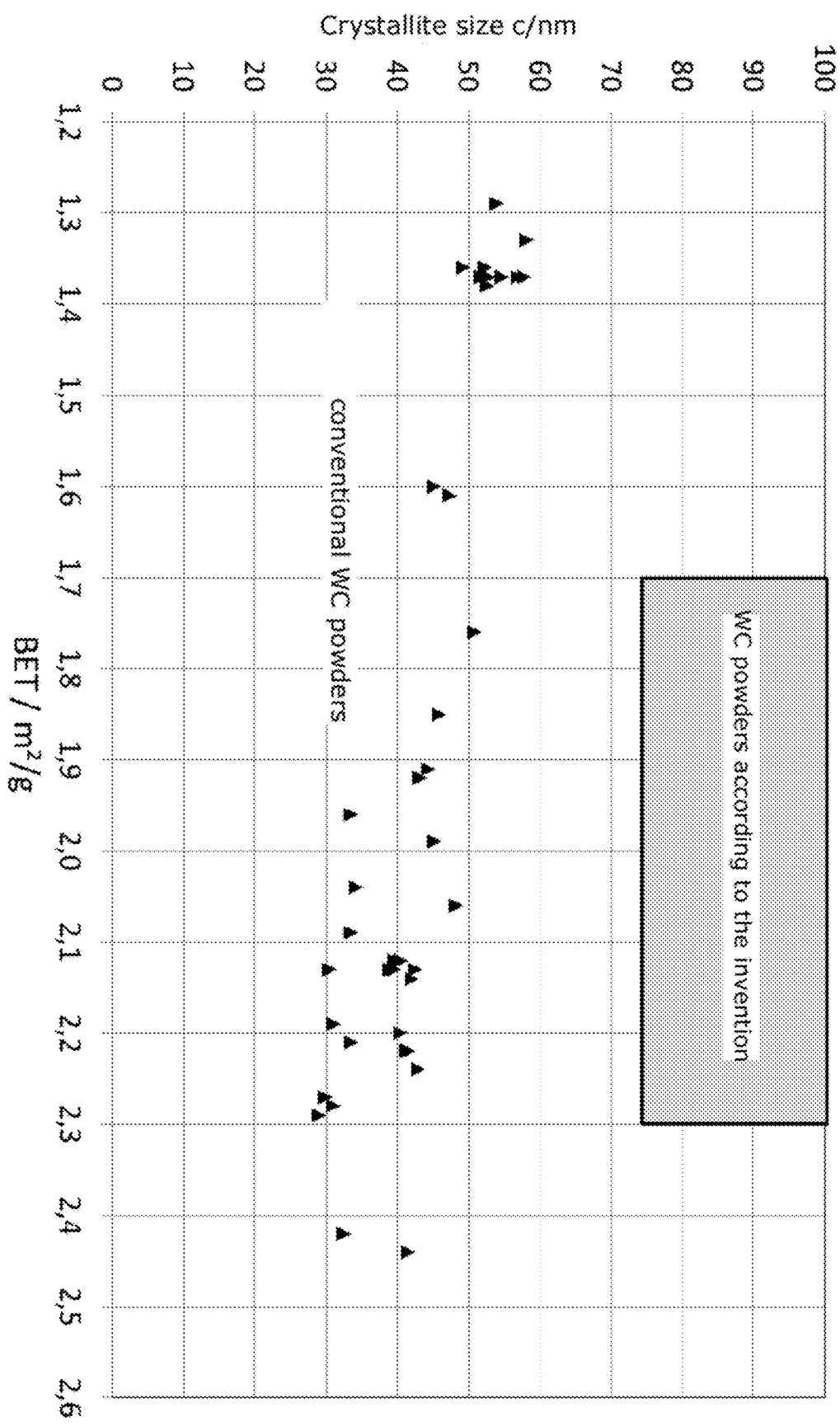
FIG. 1 shows the relationship between the crystallite size and BET surface area of tungsten carbide powders of the prior art (black triangles) and the present invention (represented by the gray area). It is seen that the powders of the present invention form crystals that are larger than those of the prior art powders.
Figure 2:
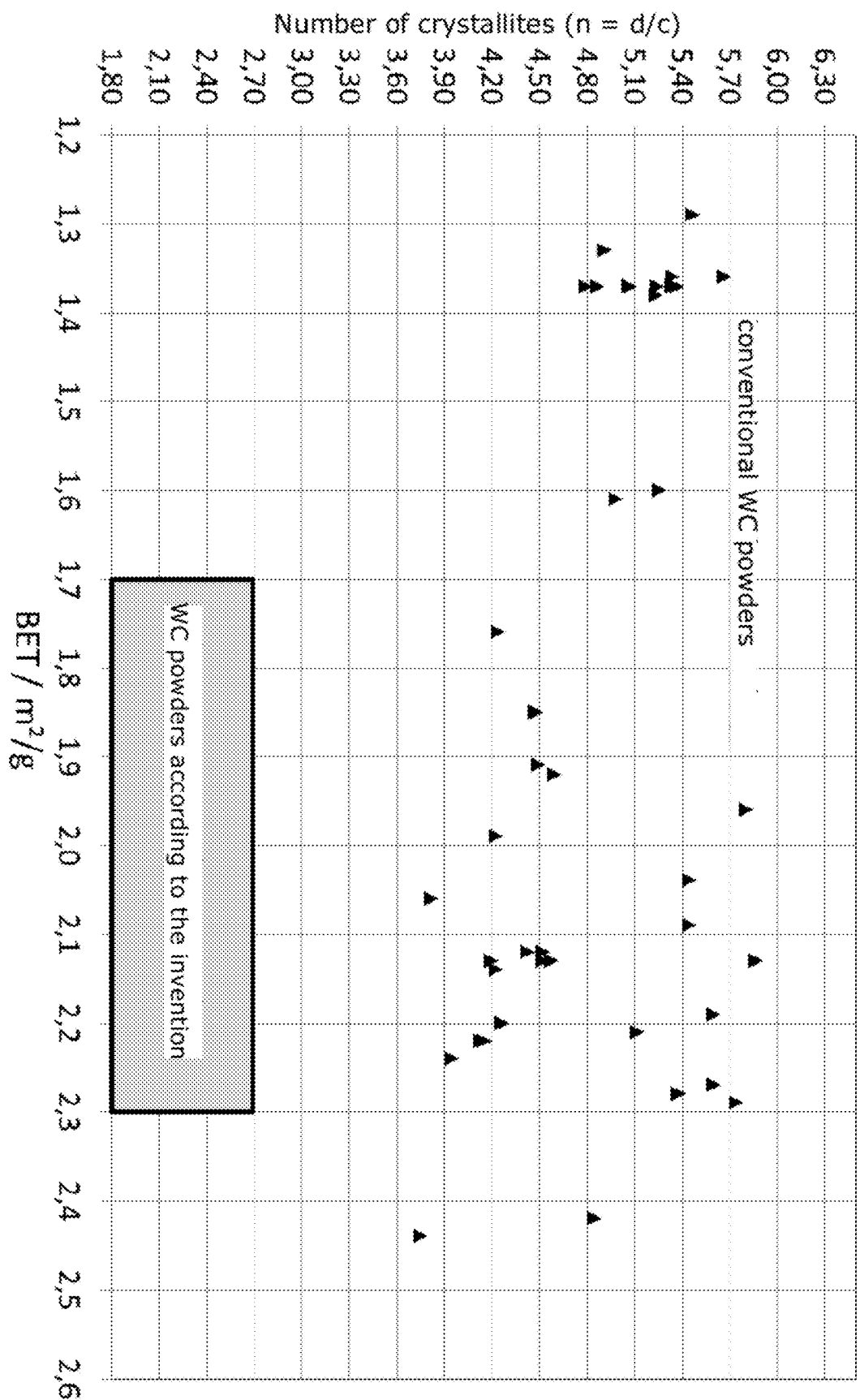
FIG. 2 shows the relationship between the number of crystallites and the BET surface area of tungsten carbide powders of the prior art (black triangles) and the present invention (represented by the gray area). It is seen that the powders of the present invention form less crystals than the prior art powders do.
Figure 3:
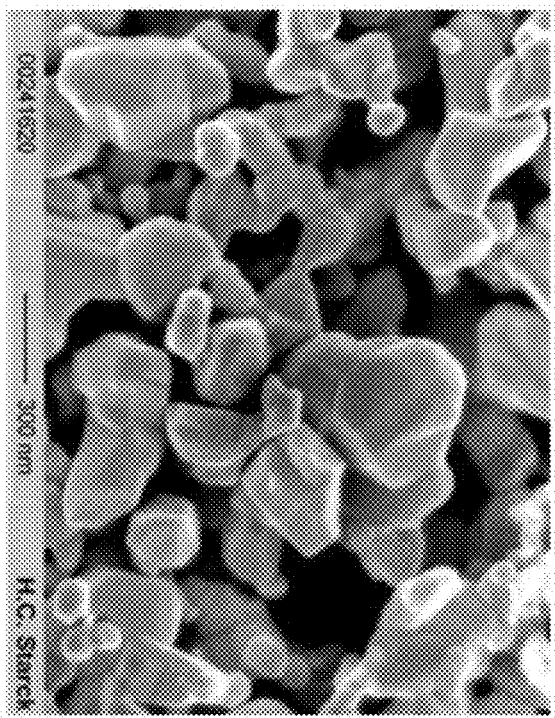
FIG. 3 shows FESEM images (field emission scanning electron microscopy) of tungsten carbide powders of the present invention (according to Example 1, see below) in different magnifications.
Figure 3:
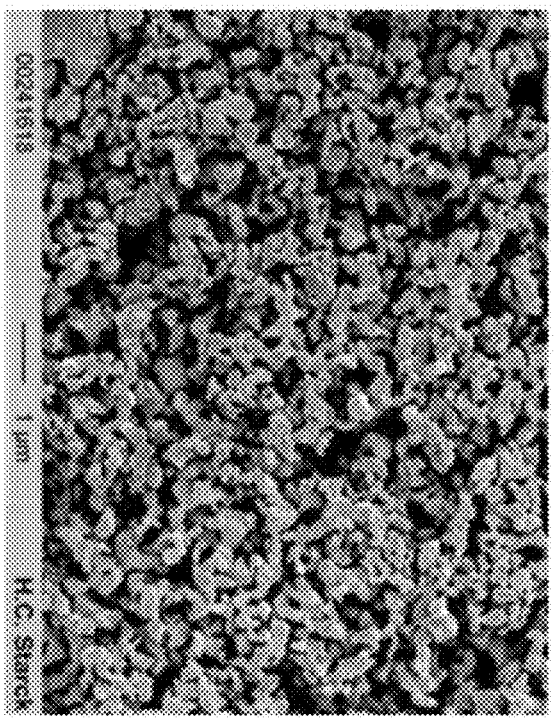
Figure 3:
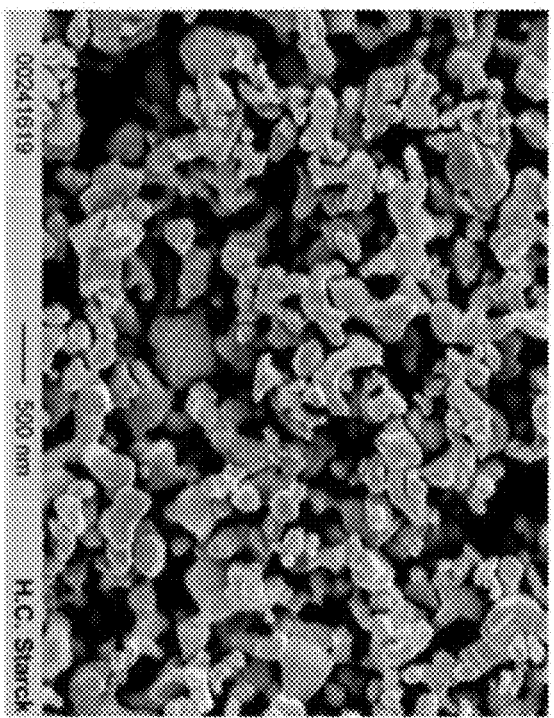
Figure 4:
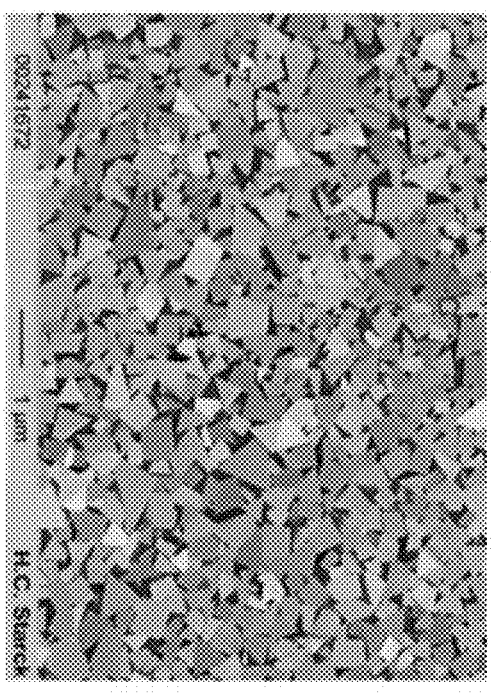
FIG. 4 shows a comparison of a cemented carbide structure prepared from a powder according to the invention (according to Example 1, see below) on the left, and a cemented carbide structure prepared from a tungsten carbide powder according to the prior art (WC DS 50 of the company H.C. Starck) on the right. It is clearly seen that the cemented carbide structures prepared from the powder according to the invention are more homogeneous.
Figure 4:
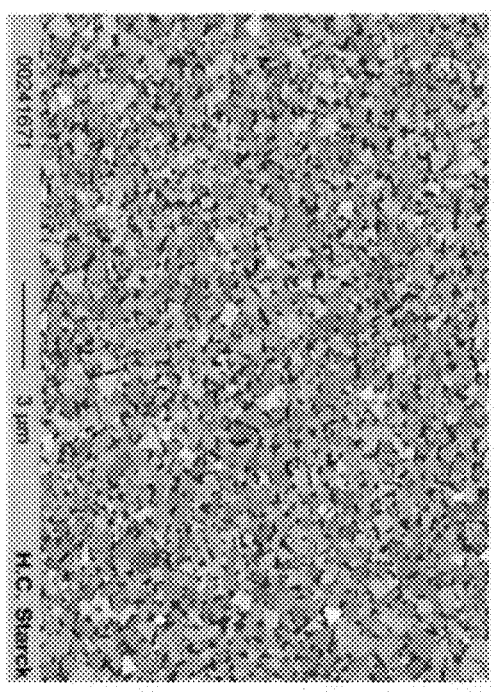
Figure 4:
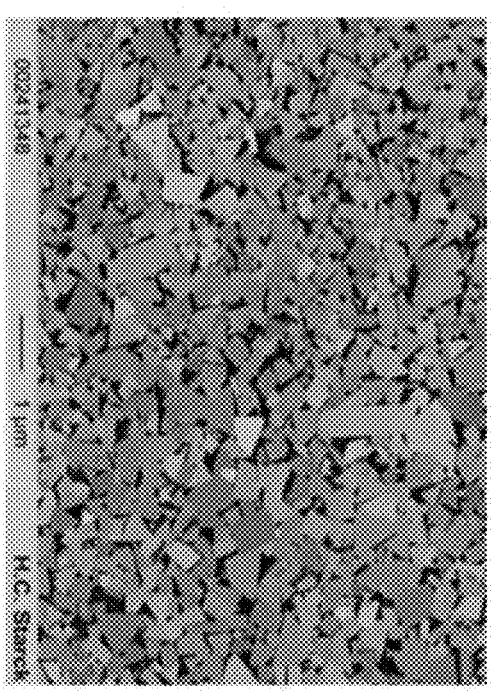
Figure 4:
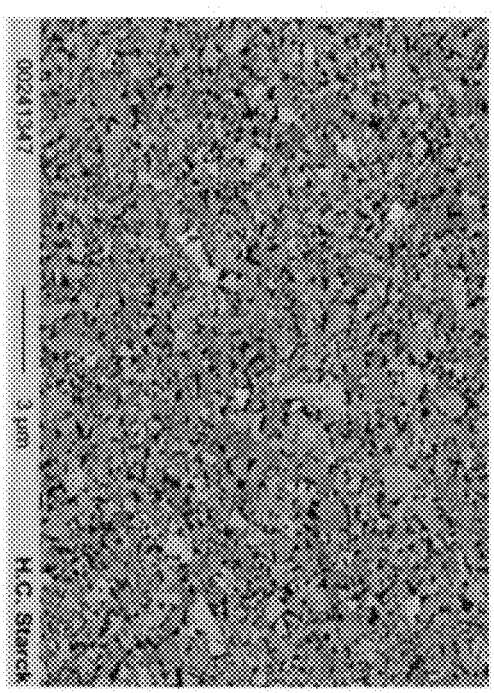

However, the cemented carbide structure of the tungsten carbide powder according to the invention is clearly more homogeneous than structures that can be achieved with the products of the prior art, for example, WC DS 50. This can be seen from the FESEM photographs of FIG. 4, in which photographs of the cemented carbide structures prepared with the powder of Example 1 according to the invention can be seen on the left, and photographs of the metal structures prepared with WC DS 50 powder according to the prior art can be seen on the right. It is clearly evident that the cemented carbide structures prepared from the powders according to the invention are significantly more homogeneous, although the production thereof was identical except for the tungsten carbide powder employed.

In addition, it has been found that the powders of the present invention were more easily processed as compared to those of the prior art.

The invention claimed is:

1. A tungsten carbide powder, the tungsten carbide powder having:
   a BET specific surface area as determined according to ASTM D 3663 of from 1.7 to 2.3 m$^2$/g;
   a crystallite size c in the individual tungsten carbide grains of from 75 to 100 nm, as determined by radiography using XRD/X-ray diffraction, single line, Scherrer method, and Fourier peak transformation evaluation with a NIST-certified crystallite size specimen as a reference;

an average grain size d, calculated by means of the formula d (in nm)=0.38((m²·nm)/g)/BET (in m²/g)·1000 from the BET specific surface area, of from 162 nm to 230 nm; and an average maximum crystallite number, n, per tungsten carbide grain, calculated according to n=d/c, of from 1.8 to 2.7.

2. The tungsten carbide powder according to claim 1, characterized in that said BET specific surface area is from 1.8 to 2.0 m²/g.

3. The tungsten carbide powder according to claim 1, characterized in that the crystallite size in the individual tungsten carbide grains is from 75 nm to 95 nm.

4. The tungsten carbide powder according to claim 1, characterized in that the average grain size is from 190 nm to 220 nm.

5. The tungsten carbide powder according to claim 1, wherein the tungsten carbide is prepared by a direct carburizing process.

6. The tungsten carbide powder according to claim 5, wherein said direct carburizing process comprises the following steps in the stated order:
   a) providing ammonium paratungstate and calcining the ammonium paratungstate to WO₃, followed by deagglomerating;
   b) mixing and kneading the WO₃ prepared in step a) with carbon black, water and organic binder to form a product;
   c) extruding the product prepared in step b) into extruded rods having a length of smaller than or equal to 10 mm, followed by drying;
   d) thermally reacting the extruded rods in a reaction oven at 900° C. to 1200° C. in the presence of a minimum amount of argon to form a tungsten carbide precursor;
   e) thermally treating the tungsten carbide precursor in a pusher furnace at temperatures of from 1300° C. to 2000° C. under a hydrogen atmosphere; and
   f) deagglomerating and homogenizing the tungsten carbide precursor to form the tungsten carbide powder.

7. A direct carburizing process for preparing a tungsten carbide powder, comprising the following steps:
   a) providing ammonium paratungstate and calcining the ammonium paratungstate to WO₃, followed by deagglomerating;
   b) mixing and kneading the WO₃ prepared in step a) with carbon black, water and organic binder to form a product;
   c) extruding the product prepared in step b) into extruded rods having a length of smaller than or equal to 10 mm, followed by drying;
   d) thermally reacting the extruded rods in a reaction oven at 900° C. to 1200° C. in the presence of a minimum amount of argon to form a tungsten carbide precursor;
   e) thermally treating the tungsten carbide precursor in a pusher furnace at temperatures of from 1300° C. to 2000° C. under a hydrogen atmosphere;
   f) deagglomerating and homogenizing the tungsten carbide precursor to form a tungsten carbide powder;
   wherein the tungsten carbide powder has:
   a BET specific surface area as determined according to ASTM D 3663 of from 1.7 to 2.3 m²/g;
   a crystallite size c in the individual tungsten carbide grains of from 75 to 100 nm, as determined by radiography using XRD/X-ray diffraction, single line, Scherrer method, and Fourier peak transformation evaluation with a NIST-certified crystallite size specimen as a reference;
   an average grain size d, calculated by means of the formula d (in nm)=0.38((m²·nm)/g)/BET (in m²/g)·1000 from the BET specific surface area, of from 162 nm to 230 nm; and
   an average maximum crystallite number, n, per tungsten carbide grain, calculated according to n=d/c, of from 1.8 to 2.7.

8. A process for preparing a cemented carbide, the method comprising:
   a) providing ammonium paratungstate and calcining the ammonium paratungstate to WO₃, followed by deagglomerating;
   b) mixing and kneading the WO₃ prepared in step a) with carbon black, water and organic binder to form a product;
   c) extruding the product prepared in step b) into extruded rods having a length of smaller than or equal to 10 mm, followed by drying;
   d) thermally reacting the extruded rods in a reaction oven at 900° C. to 1200° C. in the presence of a minimum amount of argon to form a tungsten carbide precursor;
   e) thermally treating the tungsten carbide precursor in a pusher furnace at temperatures of from 1300° C. to 2000° C. under a hydrogen atmosphere;
   f) deagglomerating and homogenizing the tungsten carbide precursor to form a tungsten carbide powder; and
   g) combining the tungsten carbide powder with a binder to form the cemented carbide;
   wherein the tungsten carbide powder has:
   a BET specific surface area as determined according to ASTM D 3663 of from 1.7 to 2.3 m²/g;
   a crystallite size c in the individual tungsten carbide grains of from 75 to 100 nm, as determined by radiography using XRD/X-ray diffraction, single line, Scherrer method, and Fourier peak transformation evaluation with a NIST-certified crystallite size specimen as a reference;
   an average grain size d, calculated by means of the formula d (in nm)=0.38((m²·nm)/g)/BET (in m²/g)·1000 from the BET specific surface area, of from 162 nm to 230 nm; and
   an average maximum crystallite number, n, per tungsten carbide grain, calculated according to n=d/c, of from 1.8 to 2.7.

9. The process of claim 8, wherein the cemented carbide comprises:
   a) a WC/Co-based cemented carbide;
   b) a cermet and P-code cemented carbide in combination with other carbides of elements Ti, Ta, Zr, Hf, Mo, Nb, W, Cr, or Fe;
   c) a cemented carbide on the basis of nitrides as hard materials; or
   d) a submicron grain cemented carbide with a Vickers hardness HV30 of >1600.

10. The process of claim 9, wherein the WC/Co-based cemented carbide is formed using grain growth inhibitors.

11. The process of claim 10, wherein the grain growth inhibitors comprise VC, Cr₃C₂, TaC, or TiC.

12. The process of claim 8, wherein the binder comprises a metallic binder.

13. The process of claim 12, wherein the binder comprises Fe, Co, or Ni.

14. The process of claim 8, wherein the cemented carbide has a binder content of less than 2%.

15. A cemented carbide comprising the tungsten carbide powder of claim 1.

16. The cemented carbide of claim 15, wherein the cemented carbide comprises:
  a) a WC/Co-based cemented carbide;
  b) a cermet and P-code cemented carbide in combination with other carbides of elements Ti, Ta, Zr, Hf, Mo, Nb, W, Cr, or Fe;
  c) a cemented carbide on the basis of nitrides as hard materials; or
  d) a submicron grain cemented carbide with a Vickers hardness HV30 of >1600.

17. The cemented carbide of claim 15, wherein the cemented carbide has a binder content of less than 2%.

18. A product comprising the tungsten carbide powder of claim 1, wherein the product is a machining tool, a drill head, a watchmaking tool, a neutron deflector, an armor-piercing projectile, a pen ball, a tire spike, a shoe spike, or a surgical instrument.

19. The product of claim 18, wherein the machining tool is a drill, a cutter, an indexable insert, or a planar knife.

* * * * *